United States Patent [19]
Haas, Sr. et al.

[11] Patent Number: 5,253,743
[45] Date of Patent: Oct. 19, 1993

[54] WAFER BLOCK MAGAZINE FOR A SHORT-TIME INTERMEDIATE STORAGE OF WAFER BLOCKS

[75] Inventors: Franz Haas, Sr., Vienna; Franz Haas, Jr., Leobendorf; Johann Haas, Klosterneuburg; Friedrich Ivan, Vienna, all of Austria

[73] Assignee: Franz Haas Waffelmaschinen Industriegesellschaft m.b.H., Vienna, Austria

[21] Appl. No.: 917,506

[22] Filed: Jul. 21, 1992

[30] Foreign Application Priority Data

Jul. 25, 1991 [AT] Austria .................................. 1489/91

[51] Int. Cl.⁵ .............................................. B65G 1/12
[52] U.S. Cl. .............................. 198/347.1; 198/347.4; 198/465.3
[58] Field of Search ................. 198/347.1, 347.4, 465.3

[56] References Cited

U.S. PATENT DOCUMENTS

| 2,944,656 | 7/1960 | Balkema ...................... 198/465.3 X |
| 4,164,391 | 8/1979 | Howard et al. ............... 198/465.3 X |
| 4,196,802 | 4/1980 | Lorentzen ..................... 198/465.3 |
| 4,964,498 | 10/1990 | Klingl ........................... 198/347.1 |
| 5,113,992 | 5/1992 | Sadamori ...................... 198/347.1 X |

FOREIGN PATENT DOCUMENTS

| 2254260 | 5/1974 | Fed. Rep. of Germany ... 198/347.1 |
| 0254403 | 11/1986 | Japan ............................. 198/347.1 |
| 0057403 | 3/1988 | Japan ............................. 198/347.1 |
| 0225210 | 9/1990 | Japan ............................. 198/347.1 |
| 2232948 | 1/1991 | United Kingdom . |

Primary Examiner—D. Glenn Dayoan
Attorney, Agent, or Firm—Collard & Roe

[57] ABSTRACT

A wafer block magazine for a shorttime intermediate storage of wafer blocks is characterized by two or more juxtaposed storage towers, which are provided with vertical conveyors, which inside each storage tower define horizontal storage compartments for the wafer blocks, which storage components are adapted to be vertically raised and lowered. The first storage tower includes a feeding station for receiving the wafer blocks. At least the last storage tower includes a taking station for delivering wafer blocks. The magazine is also characterized by a vertically displaceable horizontal conveyor for forwarding the wafer blocks between horizontally aligned storage compartments of the storage towers.

8 Claims, 6 Drawing Sheets

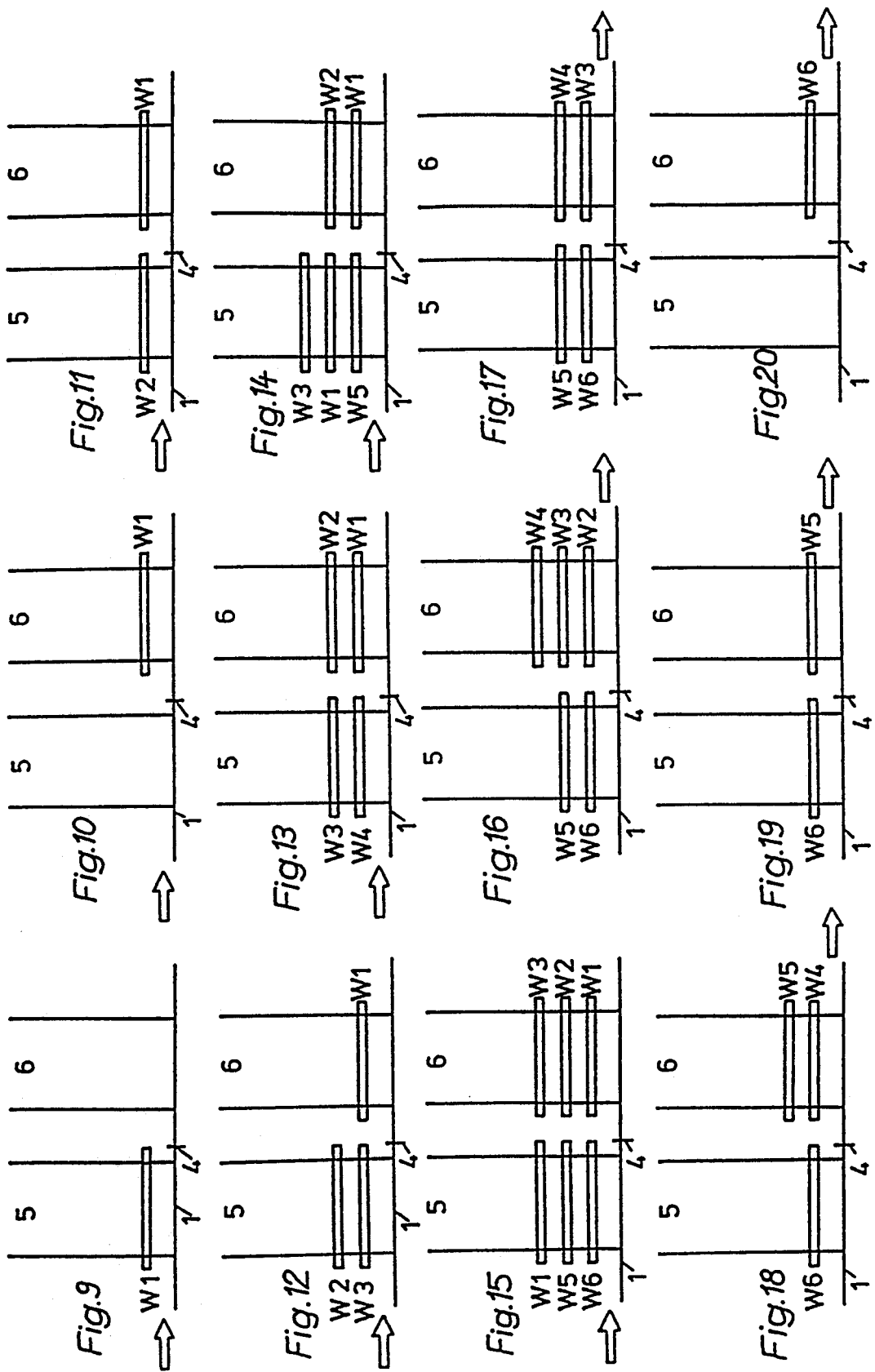

WAFER BLOCK MAGAZINE FOR A SHORT-TIME INTERMEDIATE STORAGE OF WAFER BLOCKS

BACKGROUND OF THE INVENTION

1. Field of the Invention

This invention relates to a wafer block magazine for a short-time intermediate storage of wafer blocks in plants for making and processing wafer blocks.

2. Description of the Prior Art

Wafer blocks, sometimes also called sweets blocks, are an intermediate product which is made in the wafer or sweets industry and consists of fragile, crisp, brittle, rectangular wafer sheets, which have a maximum moisture content of to 4,-,0 and in dependence on the production line are processed to form a great variety of wafer products or wafer-filled products.

Wafer sheets processed to form wafer blocks belong to wafers of that kind which in an asbaked, still warm state and when cooled to room temperature are crisp, brittle and fragile and have in the end product a maximum moisture content of 1% to 4%. Examples of such fragile and brittle wafers made on an industrial scale are rectangular wafer sheets, as well as round wafer sheets, paper-thin sheets and other so-called flat wafers, also wafer cakes, which in the wafer or sweets industry are called low hollow wafers and consist of halves of hollow bodies, which have the shape of nuts, eggs, acorns, cubes, cylinders, and the like, which halves are joined by flat webs to form large wafer cakes, as well as cast hollow wafers, such as cast wafer cornets, cast wafer cups, cast wafer figures, and the like.

These wafers must be distinguished from those wafers which are made in the wafer industry and owing to a high sugar content (up to 35% are plastically deformable in an as-baked or hot state and only as they are cooled assume a fragile, crisp, brittle consistency and in the end product have a moisture content of 1% to 4%. Examples of such wafers made on an industrial scale are rolled wailer cornets and wafer rolls, which are made in that individual flat wafers or flat wafer pieces are rolled up in a warm, plastically deformable state and are then permitted to cool down, or hollow rods or wafer rolls, which are made in that an endless baked thin wafer strip is helically wound in a plastically deformable state with overlapping convolutions around a cylindrical mandrel to form a tube, which is cut to length and permitted to cool down.

A further kind of wafers consists of wafers which are made from a wafer dough having a high egg content (10% to 50%) and which in an as-baked state and when cooled to room temperature are soft and elastic and in the end product have a moisture content in excess of 8%.

In the wafer industry it is usual to make and process the wafers of the kind described in highly automated production lines, each of which is specifically designed for a single end product.

In an example of such a production line comprising a plant for making and processing wafer blocks, liquid wafer dough is baked in a fully automatic baking machine, in most cases described as wafer-baking oven, to form large-size, thin, rectangular, brittle wafer sheets, which are taken from the wafer-baking oven and cooled in a wafer sheet cooler and are then conveyed to a wafer sheet-coating machine, in which they are coated, e.g., with a fatty cream, and stacked to form cream-filled wafer blocks. The wafer blocks are subsequently cooled to solidify the cream and to increase the coherence in each block. The wafer blocks which have left the wafer block cooler are delivered to a wafer block, slicing apparatus, in which they are cut in two directions at right angles to each other to form parallelepipedic cream-filled wafers, which are equal in size and are called waferslices or Neapolitan-type slices, which are subsequently airtightly packages in packages of equal site, which contain, e.g., ten slides per package.

In other production lines of the wafer industry, large-size rectangular wafer sheets (350 mm × 750 mm) are also baked in automatic wafer-baking machines and are processed in wafer sheet-coating machines to form an intermediate product consisting of cream-filled wafer blocks, which are cooled an in wafer-block slicing machines are subsequently sliced into small parallelepipedic wafer pieces or wafer slices or wafers of equal size, which in a separate part of the production line are coated with chocolate or another coating composition and are finally packaged in packages of equal size.

A production line for making bars of chocolate filled with wafers or wafer slices may be also used to bake large-size rectangular wafer sheets (350 mm × 750 mm) in an automatic wafer-baking machine and to coat said sheets in a wafer sheet-coating machine to make an intermediate product consisting of cream-filled wafer blocks, which are cooled and in wafer-block-slicing apparatuses are subsequently sliced into parallelepipedic wafer pieces or wafer slices which are equal in size and in a subsequently succeeding single-bar plant used to make the chocolate bars filled with wafer slices are placed into molds for casting chocolate bars so that the wafer slices are integrated in the chocolate bars.

The wafer-baking ovens or automatic wafer-baking machines which are provided at the beginning of such production lines or of those parts of such plants which serve to make and process wafer blocks are provided witth a large number of identical wafer-baking molds, each of which is included in baking tongs and comprises two rectangular baking plates. Said molds are arranged in the wafer-baking oven in a row, e.g., in an endless chain, and revolve in the wafer-baking oven from a dough-pouring station, in which liquid wafer dough is poured onto the lower baking plates of the opened baking tongs, through the baking space, in which the wafer sheets are baked in the closed baking tongs, to a wafer-taking station, in which the wafer sheets are taken from the wafer-baking oven. To start the wafer-baking oven the chain of baking tongs revolves in an empty state and the oven is heated up to the desired operating or baking temperature and only when that temperature has been reached are the supply of dough to the dough-pouring station and the pouring of the wafer dough started. When a wafer-baking oven comprising a chain of, e.g., 80 baking tongs and operated to bake each wafer sheet within two minutes is to be shut down, the supply of dough is initially shut off and the chain of baking tongs is caused to revolve further until the last wafer sheet for which dough has been poured has completely been baked and has emerged in the wafer-taking station. About 75 wafer sheets are involved in that processing after the supply of dough has been shut off. In the wafer sheet-coating machine, 25 wafer blocks consisting each of three wafer sheets and two cream layers are made from said 75 wafer sheets and must then be processed in those plant portions of the production line which succeed the wafer sheet-coating machine. When the operation of the wafer-baking oven is to be resumed, two minutes will expire from the time at which the baking temperature has been reached and the supply of dough has been resumed to the time at which the first completely baked wafer sheet can emerge from the wafer-baking oven.

If the production must ba interrupted for a relatively long time, e.g., for a servicing or alteration of individual parts of the plant, it will either be necessary to keep the wafer-baking oven in operation at its operating or baking temperature from the time at which the supply of dough is shut off to the time at which the supply of dough is resumed, or the downtime will be prolonged by the time required to reheat the wafer-baking oven. For this reason it has previously been desired to perform service work and alteration in those plant parts of the production line which succeed the wafer-baking oven only during times in which the production line is anyway shut-down for other reasons, e.g., in the evening after the production has been stopped or during the weekend, It is desired to minimize the loss of production in a production line when a broken slicing wire of a wafer block-slicing apparatus must be replaced or when the packaging film in a slice-packaging machine must be renewed or replaced. It is known that that object can be accomplished in that wafer block storage means are provided between the wafer block cooler, which succeeds the wafer sheet-coating machine, and those plant parts of the production line which succeed the wafer block cooler. In case of an interruption of the production, e.g., when the slicing machine is inoperative because a slicing wire has been broken, said wafer block storage means should be able to receive the wafer blocks made during that time without a need for shutting down the preceding machines or, if they are shut down, to permit a continued operation of those parts of the production line which precede the wafer block storage means until said preceding parts are empty. This is possible because the wafer block storage means receive from the wafer block cooler which have been made in said preceding parts until they are empty those wafer blocks. As a result, an unnecessary amount of waste wafer sheets and wafer blocks will be avoided.

Known wafer block storage means comprise a plurality of superposed transport belts or storage belts, on which consecutive wafer blocks are stored in a single file. Pivoted feed and delivery conveyor belts are provided, which indepence on the position to which they have been pivoted serve one of the transport belts and to transport the wafer blocks to and from the storage belts. Owing to the low adhesiveness of the underside of each wafer block the range of the pivotal movement of said feed and delivery belts is closely limited so that the capacity can be increased only by an increase of the length of the storage belts and a resulting increase of the overall length of the entire wafer block storage means.

U.K. patent application 2 232 948 discloses intermediate storage means for wafer blocks, which means are composed of individual independent stationary storage units, each of which is provided with a separate horizontal conveyor and which in the direction of conveyance succeed each other on a plurality of superposed levels. In said intermediate storage means for wafer blocks, stacks of wafer blocks are forwarded from storage unit to storage unit by the horizontal conveyor of the respective storage unit. Vertical conveyors are provided for transporting the stacks of wafer blocks between the superposed levels and each of said vertical conveyors moves an entire storage unit, comprising a separate horizontal conveyor, from one level to another. In those known means for an intermediate storage of wafer blocks that stack of wafer blocks which has been formed first is also taken first so that the residence times of the wafer blocks in the known apparatus vary only between the wafer blocks of a given stack. But a disadvantage of the known apparatus resides in that the sequence of-. the wafer blocks is not preserved and the differences between the residence times will increase with the required storage capacity and with the number of wafer blocks in each stack thereof. A further disadvantage of the known intermediate storage means for wafer blocks resides in that it has only a highly restricted storage capacity for wafer blocks which cannot be vertically stacked, such as wafer blocks having no cover sheet so that their top layer consists ct cream.

SUMMARY OF THE INVENTION

It is an object of the invention to eliminate these disadvantages.

This is accomplished in accordance with the invention by the provision of two or more juxtaposed storage towers, which are provided with vertical conveyors, which inside each storage tower define horizontal storage compartments for the wafer blocks, which storage components are adapted to be vertically raised and lowered, wherein the first storage tower comprises a feeding station for receiving the wafer blocks and at least the last storage tower comprises a taking station for delivering wafer blocks, and by the provision of vertically displaceable horizontal conveyor means for forwarding the wafer blocks between horizontally aligned storage compartments of the storage towers.

In the wafer block magazine in accordance with the invention each wafer block can be received and delivered by the magazine without a change of the arrangement of said wafer block relative to the next preceding wafer block and the next succeeding wafer block.

If the magazine is fed and emptied at its bottom, each wafer block will first be received by a storage compartment of the first storage tower and will then be raised to the level of the lowermost storage compartment which is still free in the second storage tower and the vertically displaceable horizontal conveyor will then be raised to the level of that lowermost free storage compartment and used to displace said wafer block into tat lowermost free storage compartment of the second storage tower. As a result, the predetermined sequence of the wafer blocks, beginning with the first wafer block in the lowermost storage compartment of the second storage tower and proceeding upwardly in the second storage tower and then downwardly in the first storage tower, will be preserved without a change as far as to the last wafer block.

If the magazine is fed and emptied at its top, each wafer block will first be received by a storage compartment of the first storage tower and will then be lowered to the level of the uppermost storage compartment which is still free in the second storage tower and by the horizontal conveyor, which has been displaced to the level of that uppermost free storage compartmemt, is displaced into that uppermost free storage compartment of the second storage tower.

A further feature of the invention resides in that a stationary horizontal conveyor is provided for the wafer blocks and extends through the storage towers and together with the vertical conveyors of the first storage tower constitutes the feeding station and together with the vertical conveyors at least of the last storage tower constitutes a taking station. With that design the wafer block magazine can directly be integrated in the production line used to make wafer blocks, which during a normal operation of the production line are conveyed by the stationary horizontal conveyor through the storage towers but are not stored therein. During a storage operation of the wafer block magazine the wafer blocks are stored in the storage towers by means of the feeding station of the first storage tower.

In accordance with a further feature of the invention the feeding station is provided at the top end of the first storage tower and comprises a feed conveyor for the wafer blocks and a taking station is provided at the top end of the last storage tower and comprises a taking device and a delivery conveyor for the wafer blocks. That design will be desirable if the magazine is arranged in a story that is disposed below the preceding and succeeding plant parts of the production line. To permit also in that case the magazine to be directly integrated in the production line, a further feature of the invention resides in that a by-pass conveyor for the wafer blocks is provided at the top ends of the storage towers and bridges the latter, the feed conveyor is movable between a feeding position, in which it is aligned with the uppermost storage compartment of the first storage tower, and a by-pass position, in which it is aligned with the by-pass conveyor, and the delivery conveyor is movable between a d&livery position, in which it is aligned with the uppermost storage compartment of the last storage tower, and a by-pass position, in which it is aligned with the by-pass conveyor. In that design the wafer blocks will be conveyed by the by-pass conveyor during the normal operation of the production line and will be conveyed through the storage towers only during a storage operation.

According to a further feature of the invention the vertical conveyors of each storage tower carry supports for the wafer blocks and said supports define the superposed horizontal storage compartments of the storage tower.

A further feature of the invention resides in that each storage compartment is defined by two mutualla opposite supports, which consist of horizontal supporting bars, which are carried by endless chain drives, and the clearance between the two supporting bars of a storage compartment is smaller than the corresponding length of the wafer blocks.

According to a further feature of the invention the chain drives which carry the supporting bars are disposed outside the interior space which in each storage tower is required to receive the wafer blocks lying on the supporting bars, said chain drives extend downwardly below the plane of conveyance defined by the stationary horizontal conveyor, and the clearance between said two supporting bars exceeds the supporting width of the stationary horizontal conveyor, measured at right angles to its direction of conveyance.

According to a further feature of the invention the vertically displaceable horizontal conveyor comprises a carrying frame, which extends horizontally through the interior spaces of the storage towers, and the vertically displaceable horizontal conveyor also comprises at least one horizontally movable pusher for displacing the wafer blocks between horizontally aligned storage compartments of storage towers. That design permits the horizontal carrying frame to be vertically guided at both its ends.

According to a further feature of the invention the vertically displaceable horizontal conveyor comprises a horizontal carrying frame, which is vertically guided only at one and adjacent to one of the storage tower, and the vertically displaceable horizontal conveyor comprises at least one horizontally movable pusher for displacing the wafer blocks between horizontally aligned storage compartments of the storage towers. With that the design the magazine in accordance with the invention may constitute a compact structure.

BRIEF DESCRIPTION OF THE DRAWINGS

FIGS. 9 to 15 schematically illustrate the operation by which a wafer block magazine comprising two storage towers is filled with six wafer blocks for intermediate storage.

FIGS. 16 to 20 schematically illustrate how a wafer block magazine comprising two storage towers is emptied by the delivery of six wafer blocks from intermediate storage.

DETAILED DESCRIPTION OF THE PREFERRED EMBODIMENTS

Figure 2:
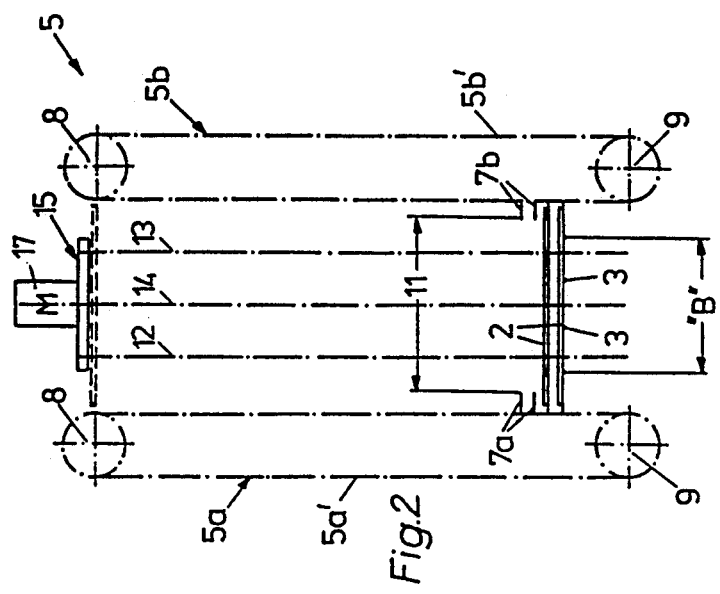
FIG. 2 is a schematic sectional view showing the wafer block magazine to FIG. 1.
Figure 1:
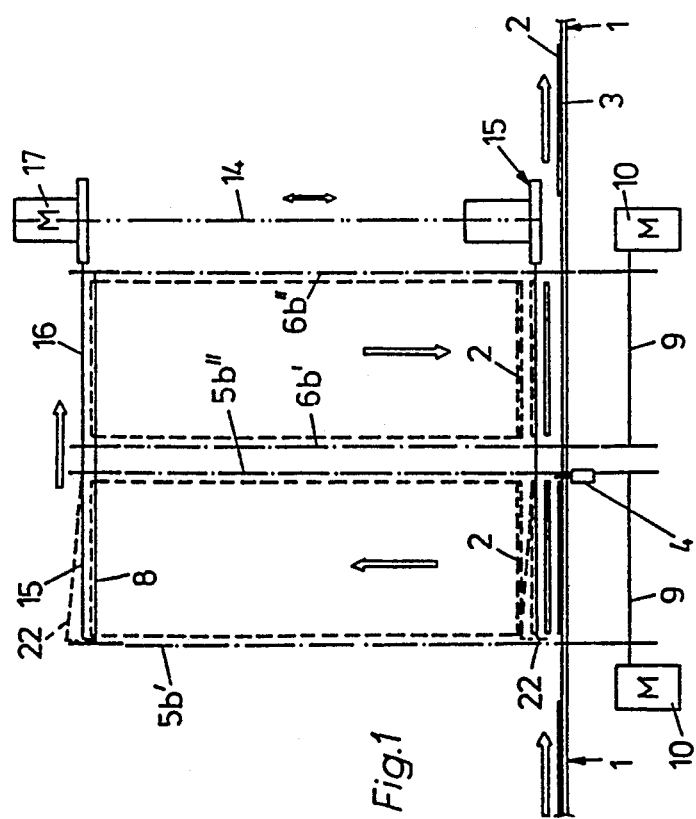
FIG. 1 is a schematic side elevation showing a first embodiment of a wafer block magazine comprising two storage towers.
Figure 3:
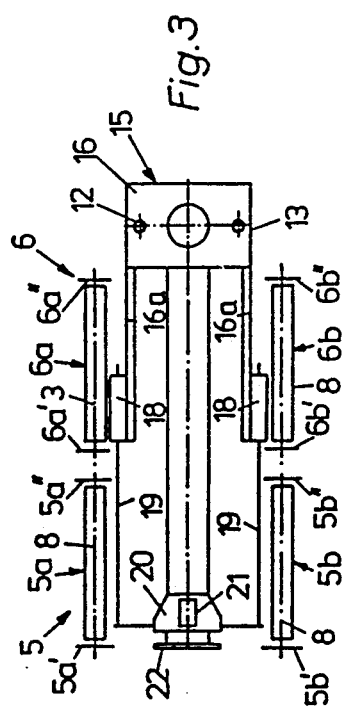
FIG. 3 is a schematic top plan view related to FIG. 1.

The wafer block magazine shown in FIGS. 1 to 3 comprises a stationary horizontal conveyor 1 for wafer blocks 2. The conveyor 1 consists of a belt conveyor comprising four round belts 3, which define a horizontal lower plane of conveyance. The stationary horizontal conveyor 1 may alternatively consist of a flat belt conveyor having a conveying belt that has a width which corresponds to the width B of the supporting surface of the lower plane of conveyance for the wafer blocks, which plane is defined by the upper courses of the round belts 3. The length of the stationary horizontal conveyor 1 is preferably restricted to the length of the wafer block magazine, which constitutes a separate plant part in a production line for making and processing wafer blocks. It will be understood that the stationary horizontal conveyor 1 may alternatively consist of a part of a conveyor which extends into or through those plant parts of the production line which precede and/or succeed the wafer block magazine. Such an arrangement may be adopted, e.g., if a wafer block magazine in accordance with the invention is to be integrated in an existing production line and the conveyor required for the magazine has already been provided between the plant parts.

The wafer block magazine in accordance with the invention shown in FIGS. 1 to 3 also comprises two vertical storage towers 5 and 6, which are arranged one behind the other at the stationary horizontal conveyor 1 viewed in its direction of conveyance. On each side of the stationary horizontal conveyor 1 each storage tower 5 or 6 comprises a vertical conveyor 5a, 5b or 6a, 6b, which extends substantially throughout the height of the storage tower 5 or 6. The vertical conveyors 5a, 5b, 6a, 6b are identical and will be explained more in detail with reference to the two vertical conveyors 5a and 5b of the storage tower 5, which is the first when viewed in the direction of conveyance. Each of the vertical conveyors 5a and 5b comprises two endless vertical chain drives 5a', 5a" or 5b', which are spaced apart and arranged one behind the other, and the supports for the wafer blocks 2, which supports are secured to said chain drives and consist of horizontal lateral supporting bars 7a, 7b, which are parallel to the direction of conveyance of the conveyor 1.

Each lateral supporting bar 7a is secured to both chain drives 5a', 5a" of the vertical conveyor 5a. This is also true for the supporting bars 7b of the vertical conveyor 5b and for the supporting bars 7a and 7b of the vertical conveyors 6a and 6b. The two reversing sprockets at the top and bottom of the two chain drives of a vertical conveyor are mounted on a common top or bottom shaft 8 or 9, which is provided at the top or bottom end of the respective storage tower 5 or 6. In each of the vertical conveyors 5a, 5b, 6a, 6b the shaft 9 which carries the bottom reversing sprockets of the two chain drives is driven by a motor 10 disposed below the lower plane of conveyance for the wafer block 2 so that the supporting bars 7a, 7b, which revolve with the chain drives 5a', 5a" or 5b', 5b" or 6a', 6a" or 6a', 6b" move through that plane of conveyance from bottom to top in the storage tower 5 and from top to bottom in the storage tower 6. The two vertical conveyors 5a, 5b or 6a, 6b of each storage tower 5 or 6 are disposed laterally of the stationary horizontal conveyor 1 and outside the interior space through which the waver blocks 2 travel in a given storage tower 5 or 6 and are so arranged that in said interior space only the storage bars 7a, 7b secured to the chain drives protrude under the lateral edge portions of the wafer blocks 2. Those two supporting bars 7a, 7b of the two vertical conveyors 5a, 5b or 6a, 6b of a storage tower 5 or 6 which lie in a common horizontal plane together define a common horizontally extending storage compartment, which is movable up and down by means of the vertical conveyors 5a, 5b or 6a, 6b. In each storage compartment the horizontal distance 11 between the confronting inner edges of the two supporting bars 7a, 7b, measured at right angles to the direction of conveyance of the stationary horizontal conveyor 1, is smaller than the corresponding length of the wafer blocks, measured at right angles to the direction of conveyance of the stationary horizontal conveyor 1, and larger than the width B of the supporting surface of the stationary horizontal conveyor 1.

A vertical guide structure comprising two vertical guide columns 12 and 13 and a vertical driving screw 14 is provided behind the second storage tower 6, viewed in the direction of conveyance of the stationary horizontal conveyor 1. That guide structure carries a vertically displaceable horizontal conveyor 15, which is disposed above the lower plane of conveyance for the wafer blocks. That vertically displaceable horizontal conveyor 15 comprises a horizontal carrying frame 16, which is vertically guided by the two vertical guide columns 12 and 13 disposed adjacent to the second storage tower 6, which carries a motor 17, which is operatively connected by a transmission to the vertical power screw 14. The horizontal carrying frame 16 comprises two carrying arms 16a, which protrude into the free interior space of the second storage tower 6. Horizontal cylinders 18, which are operable by compressed air, are secured to the two carrying arms 16a and comprise piston rods 19, to which an extensible and retractable carrying arm 20 is secured, which carries a pusher 22 for the wafer blocks 2. That pusher 22 is pivotally movable about a horizontal axis by means of a swiveling drive 21 and is horizontally displaceable by means of the compressed-air cylinders 18.

Figure 4:
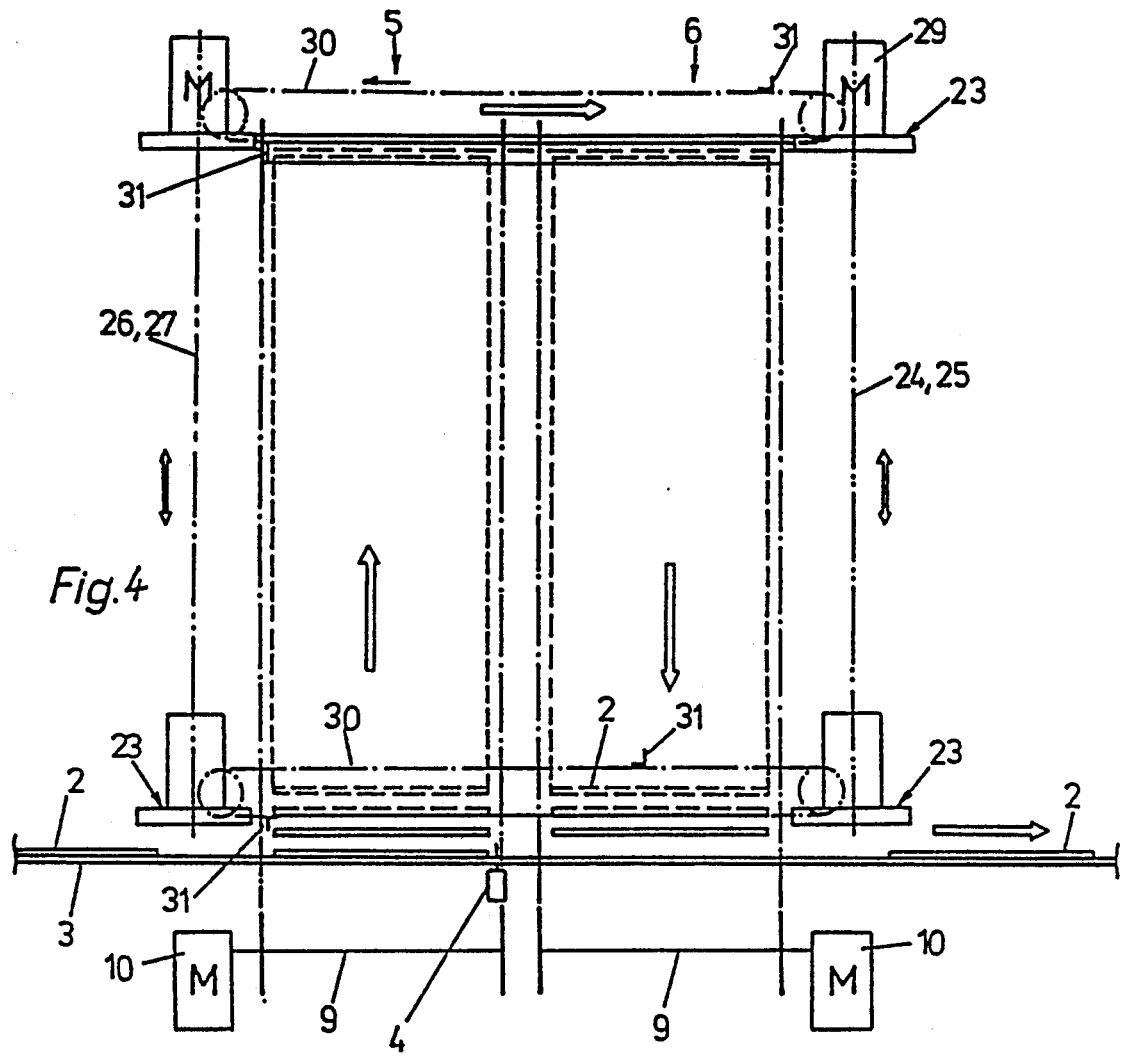
FIG. 4 is a schematic side elevation showing a second embodiment of a wafer block magazine comprising two storage towers.
Figure 5:
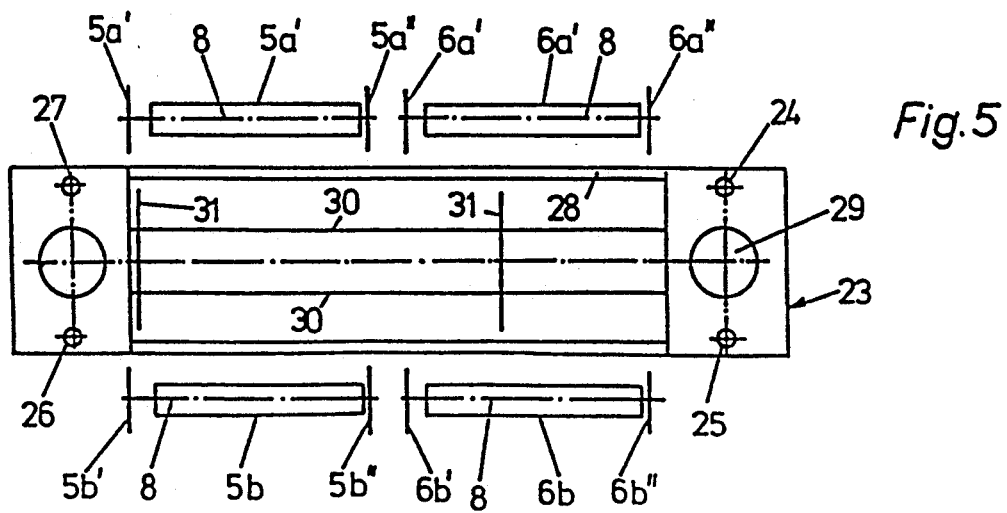
FIG. 5 is a schematic top plan view related to FIG. 4.

The wafer block magazine shown in FIGS. 4 and 5 differs from the illustrative embodiment shown in FIGS. 1 to 3 only by the design of the vertically displaceable horizontal conveyor and of the vertical guide structure associated therewith. This embodiment comprises for the vertically displaceable horizontal conveyor 23 a vertical guide structure, which comprises vertical guide columns 24, 259 269 279 which are disposed in front of the first storage tower 5 and behind the second storage tower 6. The vertically displaceable horizontal conveyor 23 comprises a horizontal carrying frame 28, which is guided by the guide columns 24, 25, 263 27 and carries a motor 29 for vertically displacing the carrying frame and extends through the free interior spaces of the two storage towers 5 and 6. A horizontal endless chain drive 30 extends in the carrying frame parallel to its longitudinal center line and is adapted to be driven by a motor, not shown and has two chain courses, to which a pusher 31 for the wafer blocks 2 is secured. That pusher is horizontally displaceable by the chain drive 30.

In the two wafer block magazines shown in FIGS. 1 to 3 and 4 and 5, respectively, the vertically displaceable horizontal conveyor 15 or 23 is vertically moved up and down by vertical power screws, which are operatively connected to gearmotors 29 and in mesh with nuts, which are fixed to the horizontal carrying frame 16 or 28. The vertical power screws might be replaced by chain drives or cogged belt drives, which revolve in a vertical plane and serve to vertically displace the vertically displaceable horizontal conveyor 15 or 23. In case of need the wafer magazines in accordance with the invention may be surrounded by a heat-insulating sheath 43, which encloses storage towers and has openings only for the entrance and exit of the wafer blocks. If desired, the interior space enclosed by the sheath 43 may be supplied with cooled and conditioned air for cooling the wafer blocks in intermediate storage if the wafer block magazine succeeds a wafer block cooler.

During the normal operation of the production line for making and processing wafer blocks 2, all wafer blocks are conveyed by the stationary horizontal conveyor 1 through the currently lowermost (empty) storage compartments of the first storage tower and of the second storage tower 6 without contacting the lateral supporting bars 7a, 7b of said two storage compartments.

The filling of the magazine drawn in FIGS. 1 to 3 and 4 and 5. respectively, is schematically illustrated in FIGS. 9 to 15.

When it is desired to fill the wafer block magazine, each wafer block 2 is arrested by a stop 4, which is adapted to be raised above the lower plane of conveyance and to be lowered below that plane and the wafer block is thus vertically aligned with the first storage tower 5. The two vertical conveyors 5a and 5b of the first storage tower 5 are then started and the first wafer block W1 is raised by the lateral supporting bars 7a, 7b of the lowermost storage compartment until the next storage compartment is on the level of the round belts 3. The vertically displaceable horizontal conveyor 15 is now in its lowermost position above that storage compartment of the storage tower which has just been raised and has now received the first wafer block W1 and the vertically displaceable horizontal conveyor 15 is at that time above that empty storage compartment of the second storage tower 6 which is horizontally aligned with the storage compartment which contains the third wafer block W3 is roved to a position closely below the vertically displaceable horizontal conveyor 15 or 23 and is novi horizontally aligned with the lowermost empty storage compartment of the second storage tower 6; that storage compartment is disposed above the second wafer block W2. Thereafter the third wafer block W3 is displaced from the storage compartment of the first storage tower 5 to that of the second storage tower 6 and the sixth wafer block W6 is subsequently received by the first storage tower.

While the magazine is being filled, the two vertical conveyors 6a, 6b of the second storage tower 6 remain stationary and only the two vertical conveyors 5a, 5b of the first storage tower 5 raise the storage compartments by story so that the vertically displaceable horizontal conveyor 15 or 23, which is also raised story by story, can displace the currently uppermost wafer block of the first storage tower 5 into the currently lowermost empty storage compartment of the second storage tower 6.

The emptying of the magazine is illustrated in FIGS. 16 to 20. During that operation the vertical conveyors 5a, 5b of the first storage tower 5 are stationary and the vertical conveyors 6a, 6b of the second storage tower 6 lower the storage compartments story by story and the vertically displaceable horizontal conveyor 15 or 23, which is also vertically lowerable story by story, now displaces the currently uppermost wafer block of the first storage tower 5 into that free storage compartment which in the second storage tower 6 is disposed over the uppermost wafer block in the second storage tower 6. That operation is continued until the vertically displaceable horizontal conveyor 15 or 25 has returned to its lowermost position and the last wafer block, in the illustrated example the sixth wafer block W6, has been placed on the round belts 3 of the stationary horizontal conveyor 1 in the lower plane of conveyance.

Figure 6:
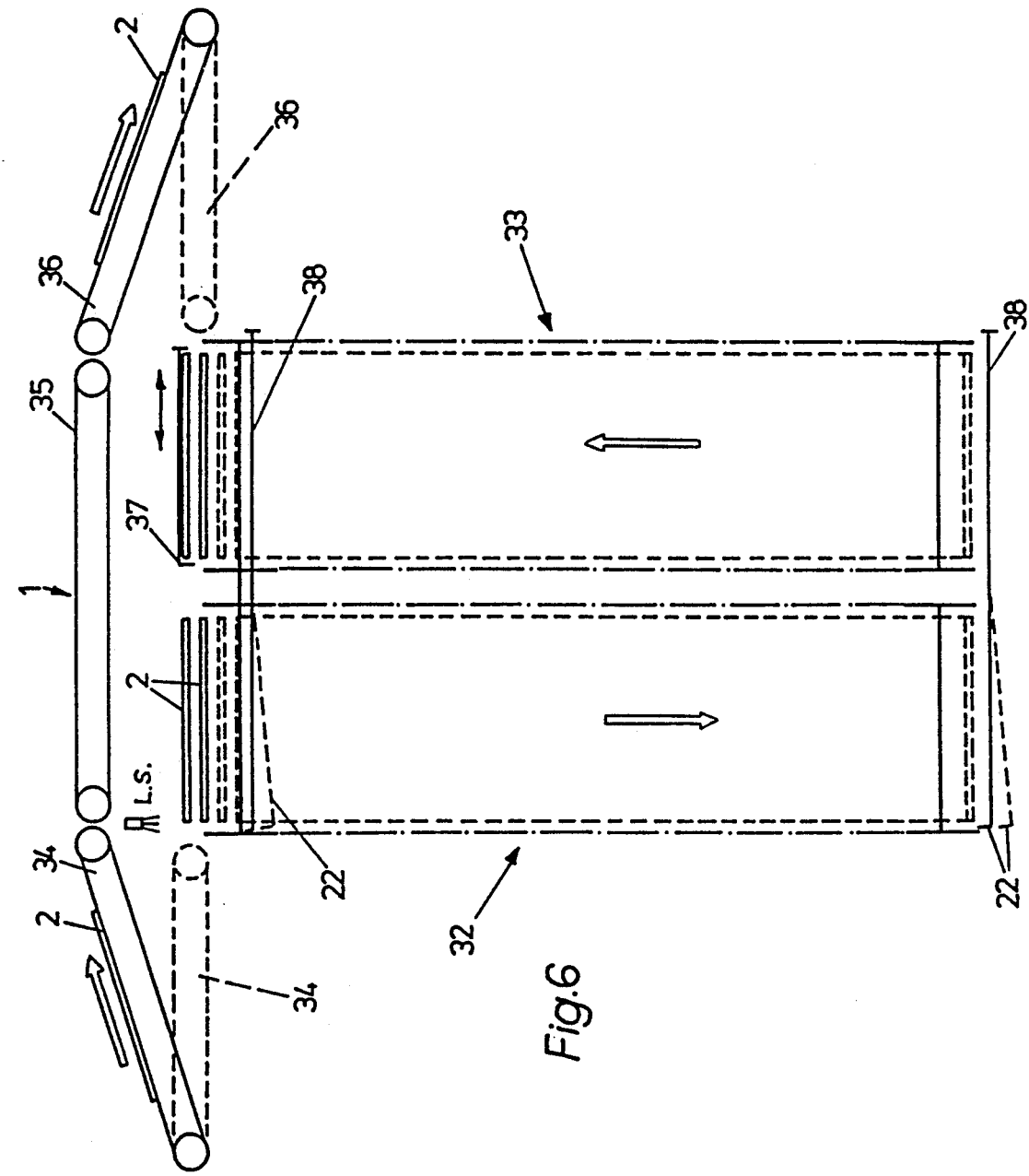
FIG. 6 is a schematic view showing a further embodiment of a wafer block magazine comprising two storage towers, which are fed and discharged at their top ends.

In the embodiment schematically shown in FIG. 6, the wafer block magazine in accordance with the invention differs from the embodiments shown in FIGS. 1 to 3 and 4 and 5 mainly in that the two storage towers 32 and 33 are filled and emptied at their top ends and that a by-pass line for the wafer blocks 2 is provided above the two storage towers 32 and 33 and during a normal operation of the production line serves to convey the wafer blocks 2 past the storage towers 32, 33.

In the wafer block magazine shown in FIG. 6 the stationary horizontal conveyor 1 comprises a feed conveyor 34, which is pivoted on a stationary horizontal axis, a horizontal by-pass conveyor 35, which bridges the two storage towers 32 and 33, and a delivery conveyor 36, which is pivoted on a stationary horizontal axis. The feed conveyor 34 belongs to the f ceding station of the first storage tower 32 and is pivotally movable between a horizontal feeding position and an upwardly inclined by-pass position. In the feeding position a wafer block 2 on the feed conveyor is displaced into the uppermost horizontal storage compartment of the first storage tower. In the by-pass position the wafer block 2 is forwarded to the by-pass taking station of the second storage tower 33 and is pivotally movable between a discharge or taking position and an inclined or by-pass position. In the discharge or taking position the delivery conveyor 36 is aligned with %he uppermost horizontal storage compartment of the second storage tower 33. In the inclined or by-pass position the delivery conveyor 36 is aligned with the by-pass conveyor 35. A transfer device 37 for the wafer blocks 2 is provided at the taking station of the second storage tower 33 and transfers the wafer blocks from the uppermost storage compartment of the second storage tower 33 to the delivery, conveyor 36. In FIG. 6 that transfer device 37 is illustrated as a horizontally reciprocable pushers which is roved into engagement with the wafer block from above.

In the wafer block magazine shown in FIG. 6 the two storage towers 32, 33 and the vertically displaceable horizontal conveyor 38 are substantially designed as in the illustrative embodiments shown in FIGS. 1 to 5. But the vertically displaceable horizontal conveyors are turned upside down relative to those shown in FIGS. 1 to 5 so that they can engage the wafer blocks from underneath with upwardly protruding pushers. The vertically displaceable horizontal conveyor 38 is lowered in steps compartment by compartment during the filling of the magazine and is raised in steps compartment by compartment during the emptying of the magazine.

Figure 7:
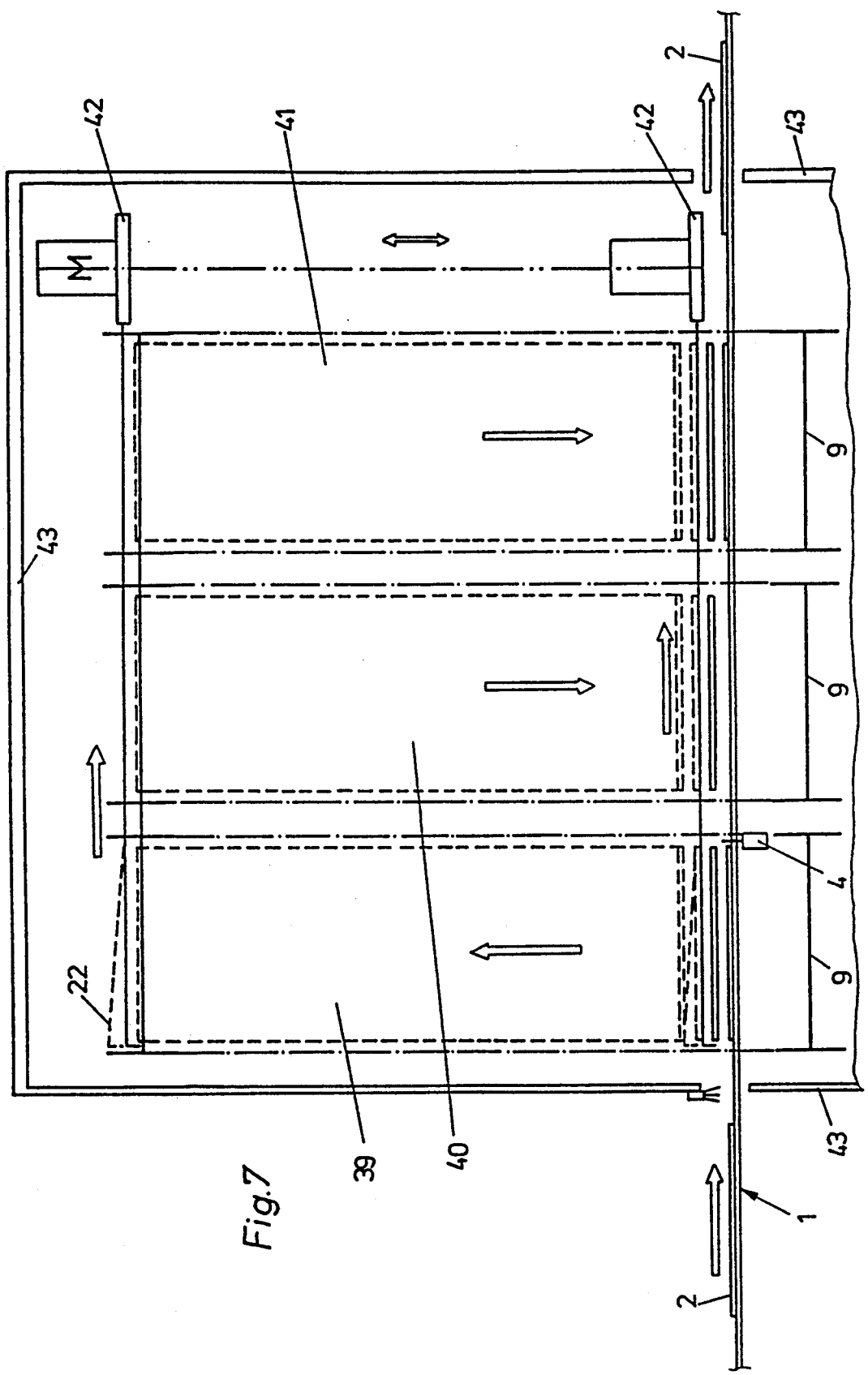
FIG. 7 shows an embodiment of a wafer block magazine comprising three storage towers.

In the embodiment shown in FIG. 7 the wafer block magazine in accordance with the invention comprises three storage towers 30, 40, 41, which are arranged one behind the other, and a vertically displaceable horizontal conveyor 42, which extends through all three storage towers.

To fill the magazine shown in FIG. 7 just as in the other embodiments only the storage compartments of the first storage tower 39 are raised in steps whereas the storage compartments of the other storage compartments 40 and 41 are stationary and the vertically displaceable horizontal conveyor 42 is also raised in steps and in each position horizontally displaces the wafer blocks 2 from the storage compartments of the first storage tower 39 to the storage compartments of the two other storage towers. In that operation the first wafer block received by the first storage tower 39 is displaced into the third storage tower 41, the second wafer block into the second storage tower 40, the third wafer block again into the third storage tower 41, the fourth wafer block into the second storage tower 40, the fifth wafer block again into the third storage tower 41, the sixth wafer block again into the second storage tower 40 and so forth until all storage compartments of all three storage towers 39, 40 and 41 are occupied. If each storage tower comprises, e.g., 20 storage compartments, the wafer blocks W1, W3, W5, W7 . . . W37, W39 will be in the third storage tower 41, the wafer blocks W2, W4, W6, W8 . . . W38, W40 will be in the second storage tower 40 and the wafer blocks W 41, W42, W43, W44 . . . W57, W58, W59, W60 will be in the first storage tower 39 when the magazine is full.

During the emptying of the magazine shown in FIG. 7 the storage compartments of the first storage tower 39 are stationary and the storage compartments of the second and third storage tower are lowered in steps and the vertically displaceable horizontal conveyor 42 is lowered in steps and horizontally displaces the wafer blocks 2 between the storage compartments of all three storage towers. In that operation the wafer block W1 from the third storage tower 41 is first deposited on the stationary horizontal conveyor 1 and is forwarded by the latter. Then the wafer block W2 is displaced from the second storage tower 40. Thereafter the wafer block W41 is displaced from the first storage tower 39 into the third storage tower 41. Thereafter the wafer blocks W3 and W4 are issued from the third and second storage towers 41 and 40, respectively. Thereafter the wafer block W42 is displaced from the first storage tower 39 into the second storage tower 40. Thereafter the wafer blocks W5, W6, W7, and W8 are issued from the third and second storage towers 41 and 40, respectively, and thereafter the wafer block W43 is displaced from the first storage tower 39 into the third storage tower 41. Thereafter the wafer blocks W9 and W10 are issued from the third and second storage towers 41 and 40, respectively and the wafer block W44 is subsequently displaced from the second storage tower 39 into the second storage tower 40. Thereafter the wafer blocks W11, W12, W13, and W14 are issued from the third and second towers 41 and 40, respectively, and the wafer block W45 is subsequently displaced from the first storage tower 39 into the third storage tower 41 and so forth. The wafer blocks are fed and delivered by the stationary horizontal conveyor 1.

If there is a demand for storage during the emptying of the wafer block magazine shown in FIG. 7, the storage compartments of the second and third storage towers 40 and 41 will simply be arrested and the storage compartments of the first storage tower 39 will again be raised in steps and by means of the vertically displaceable horizontal conveyor 42 the odd-numbered wafer blocks will be displaced into the third storage tower 41 and the even-numbered wafer blocks will be displaced into the second storage tower 40 so that all storage compartment of the wafer block magazine are occupied.

Figure 8:
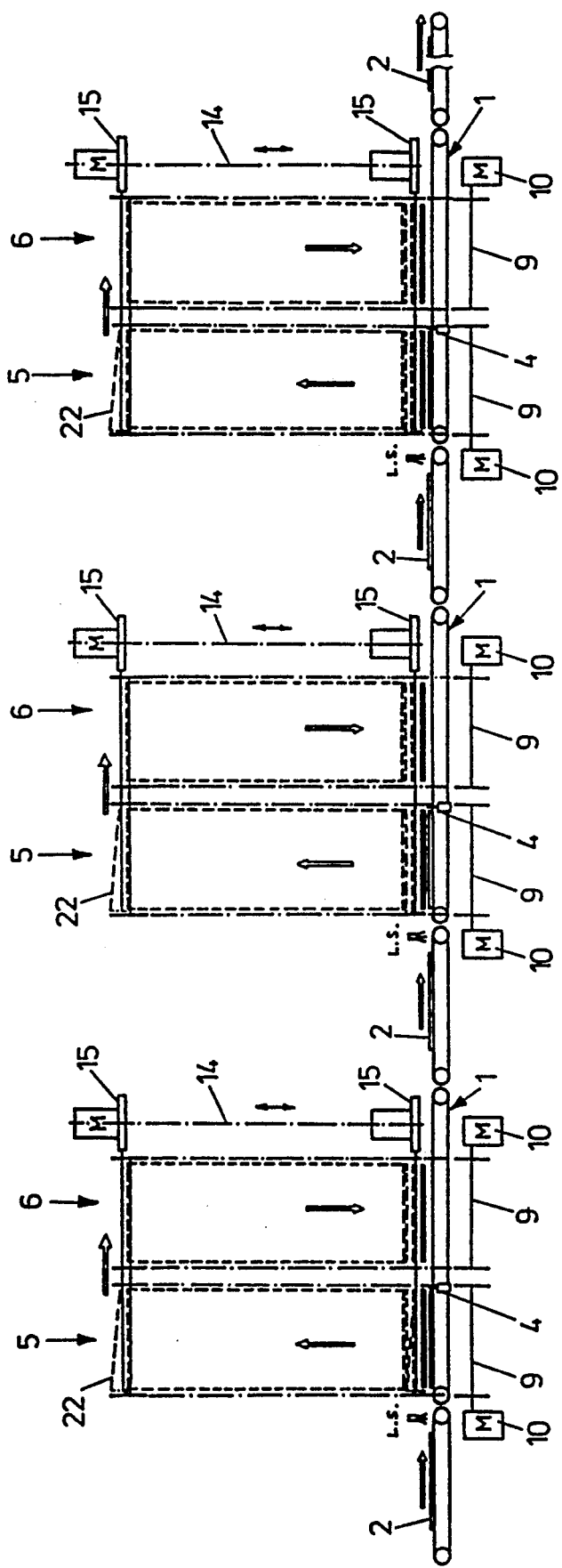
FIG. 8 schematically shows three consecutive wafer block magazines comprising two storage towers each.

FIG. 8 shows an intermediate storage system for wafer blocks, which consists of three wafer block magazines of the embodiment shown in FIGS. 1 to 3, which are arranged one behind the other. The storage towers are designated tower 1, tower 2, tower 3, tower 4, tower 5, and tower 6. In that intermediate storage system for wafer blocks the operation described hereinbefore with reference to the magazine shown in FIGS. 1 to 3 is performed in that the magazine comprising the storage towers 5 and 6 is filled first, thereafter the magazine comprising the towers 3 and 4 and finally the magazine comprising the towers 1 and 2. Emptying is performed in the reverse order. It will be understood that the sequence and number of the magazines which are employed may be changed as required.

For instance, a new demand for storage may occur when the filled intermediate storage system for wafer blocks may have been emptied to such an extent that the towers 5 and 6 are already empty and the emptying of the towers 3 and 4 is about to begin. In that case the emptying of the intermediate storage system for wafer blocks will be interrupted and the towers 5 and 6 will be filled with the new wafer blocks to be stored. Thereafter the emptying of the intermediate storage system for wafer blocks will be continued from towers 3 and 4 and thereafter the towers 1 and 2 will be emptied too and finally also the towers 5 and 6.

Whereas the present invention has been described with reference to wafer block magazines for receiving only one wafer block in each storage compartment of a storage tower, it will be understood that it is also possible to effect an intermediate storage of wafer blocks which have been stacked to form a wafer book consisting of, e.g., four superimposed wafer blocks, in each storage compartment of wafer block magazines in accordance with the invention which have correspondingly higher storage compartments. In that case the sequence of the wafer books will not be changed during the filling and emptying of the magazine. This will specifically be of advantage if the blocks which are stacked to form a wafer book are sliced at once as a wafer book.

We claim:

1. A wafer block magazine for the temporary storage of wafer blocks, comprising
   (a) vertical storage towers,
      (1) at least one of said towers having a feeding station and an additional one of said towers having a discharge station, and
      (2) each one of the vertical storage towers defining a vertically extending, free interior space open at opposite sides, the towers being sequentially juxtaposed in a row along the opposite open sides,
   (b) vertical conveyors arranged laterally of the free interior space of an associated on of the towers, each one of the vertical conveyors including
      (1) wafer block support elements movable vertically up and down in the associated tower, the support elements defining horizontal storage compartments for receiving respective ones of the wafer blocks, and
   (c) a horizontal conveyor vertically displaceable within the interior spaces of the juxtaposed towers for transferring the wafer blocks between horizontally aligned ones of the storage compartments of the towers.

2. The wafer block magazine of claim 1, wherein a first one in the row of towers has the feeding station arranged at an upper end of the first tower and a last one in the row of towers has the discharge station arranged at an upper end of the last tower, the feeding station comprises a delivery conveyor for the wafer blocks, the discharge station comprises a discharge device and a discharge conveyor for the discharged wafer blocks, and the vertically displaceable horizontal conveyor is arranged below the upper ends of the first and last towers.

3. The wafer block magazine of claim 2, further comprising a by-pass conveyor for the wafer blocks arranged to bridge the upper ends of the juxtaposed vertical storage towers, the delivery conveyor being displaceable between a delivery position oriented towards the upper end of the first tower and a by-pass position oriented towards the by-pass conveyor, and the discharge conveyor being displaceable between a discharge position oriented towards the upper end of the last tower and a by-pass position oriented towards the by-pass conveyor.

4. The wafer block magazine of claim 1, wherein the vertically displaceable horizontal conveyor comprises a horizontal carrier frame extending through all the interior spaces of the juxtaposed vertical storage towers and being vertically displaceable therein, and a horizontally displaceable entrainment element for entraining wafer blocks between horizontally aligned storage compartments of the towers.

5. The wafer block magazine of claim 1, wherein the vertically displaceable horizontal conveyor comprises a carrier frame arranged adjacent a single one of the towers and extending only through the interior space of the adjacent tower, and a horizontally displaceable entrainment element for entraining wafer blocks between horizontally aligned storage compartments of the towers, and further comprising a guiding device arranged adjacent the single tower for vertically guiding the carrier frame.

6. A wafer block magazine for the temporary storage of wafer blocks, comprising
   (a) a stationary horizontal conveyor for the wafer blocks,
   (b) vertical storage towers,
      (1) at least one of said towers having a feeding station and an additional one of said towers having a discharge station, and
      (2) each one of the vertical storage towers defining a vertically extending, free interior space open at opposite sides, the towers being sequentially juxtaposed in a row along the opposite open sides and along the stationary horizontal conveyor, the stationary horizontal conveyor extending through the interior spaces of the towers,
   (c) vertical conveyors arranged laterally of the free interior space of an associated one of the towers, each one of the vertical conveyors including
      (1) wafer block support elements movable vertically up and down in the associated tower, the support elements defining horizontal storage compartments for receiving respective ones o the wafer blocks, and
   (d) another horizontal conveyor arranged above the stationary horizontal conveyor and vertically displaceable within the interior spaces of the juxtaposed towers for transferring the wafer blocks between horizontally aligned ones of the storage compartments of the towers.

7. The wafer block magazine of claim 6, wherein the vertically displaceable horizontal conveyor comprises a horizontal carrier frame extending through all the interior spaces of the juxtaposed vertical storage towers and being vertically displaceable therein, and a horizontally displaceable entrainment element for entraining wafer blocks between horizontally aligned storage compartments of the towers.

8. The wafer block magazine of claim 6, wherein the vertically displaceable horizontal conveyor comprises a carrier frame arranged adjacent a single one of the towers and extending only through the interior space of the adjacent tower, and a horizontally displaceable entrainment element for entraining wafer blocks between horizontally aligned storage compartments of the towers, and further comprising a guiding device arranged adjacent the single tower for vertically guiding the carrier frame.

* * * * *